Oct. 24, 1939.    M. J. ULINE    2,177,445
MACHINE FOR CUTTING BLOCKS OF ICE INTO SMALL CUBES
Filed May 11, 1937    7 Sheets-Sheet 1

Inventor
M. J. ULINE

By Pattison Wright & Pattison
Attorneys

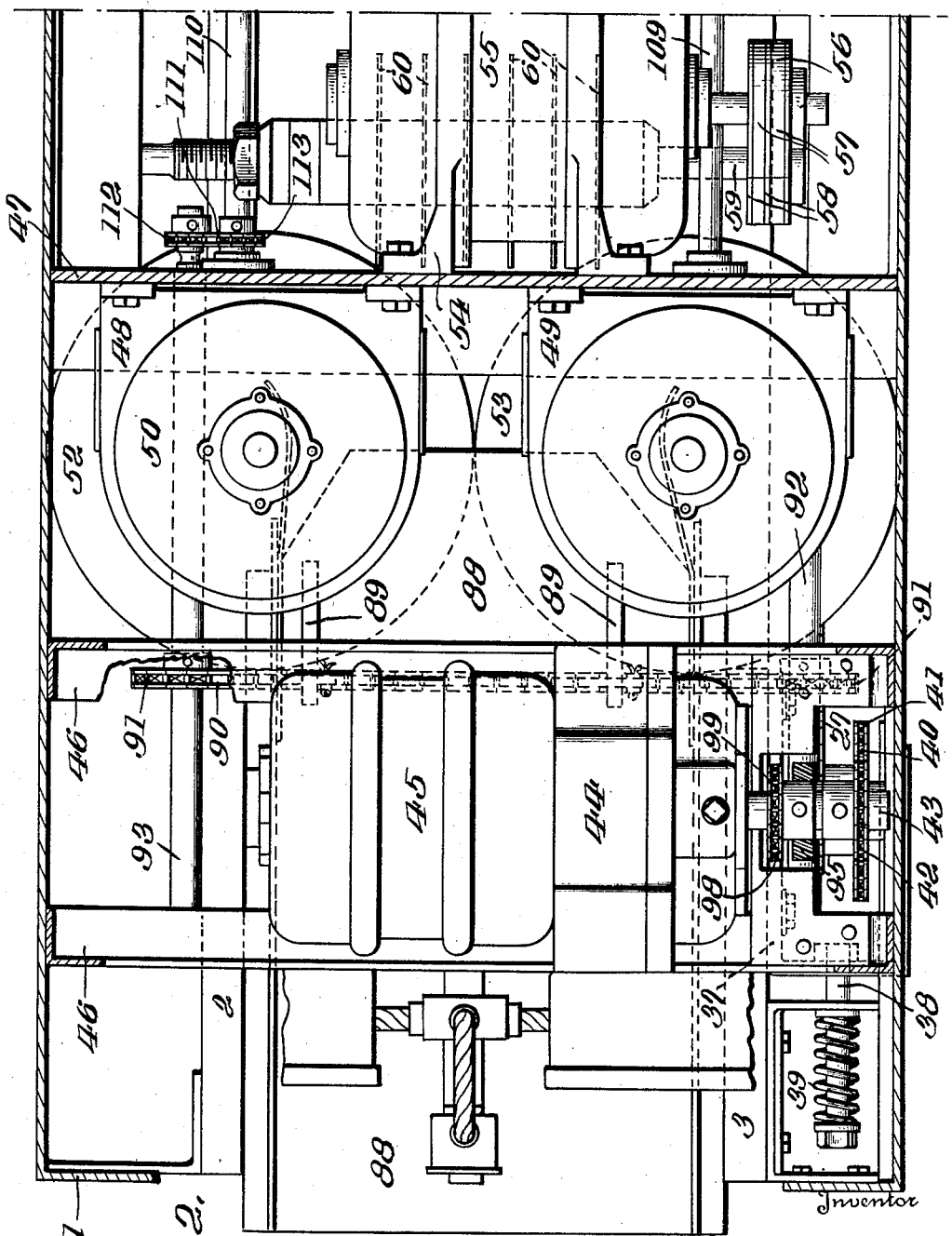

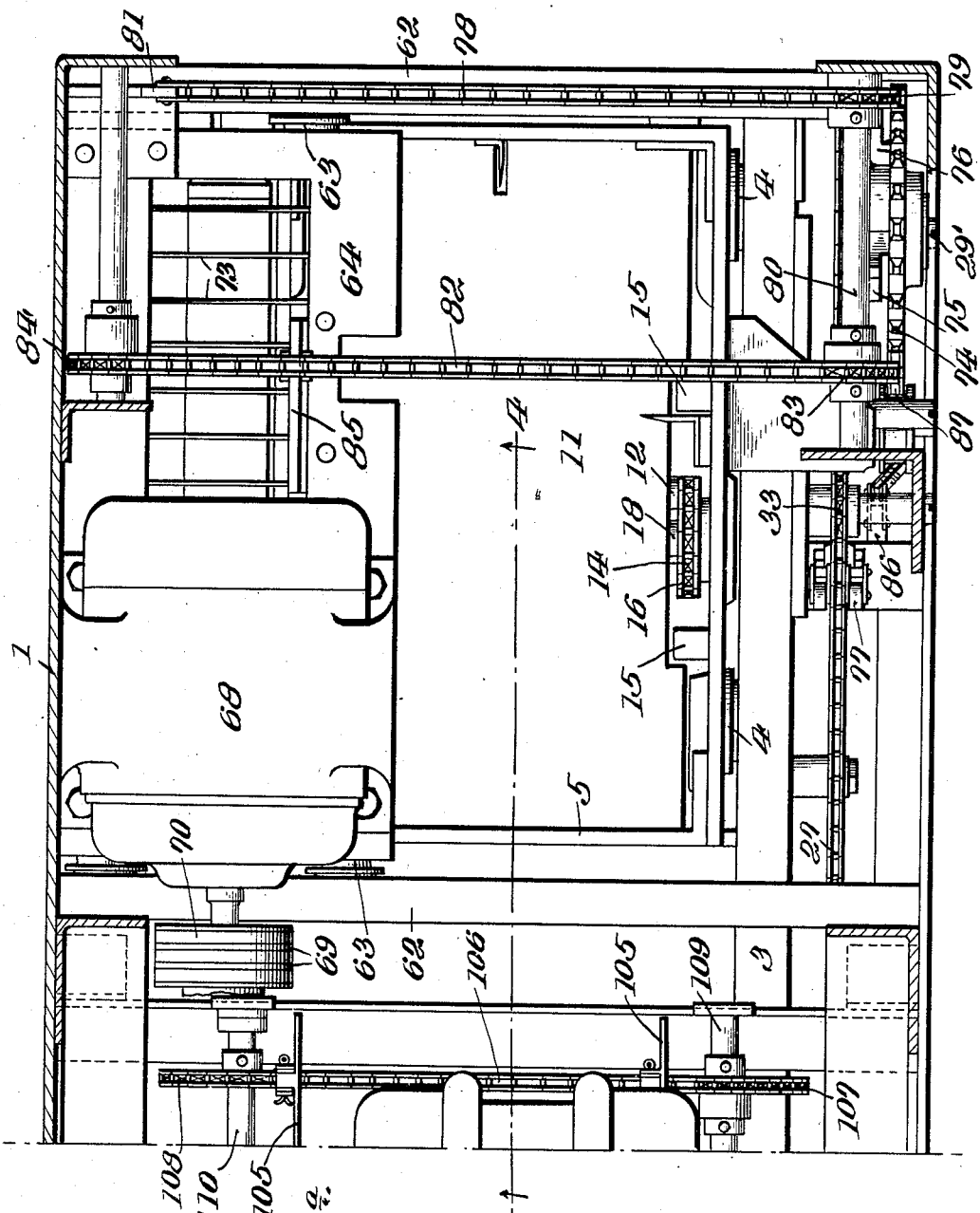

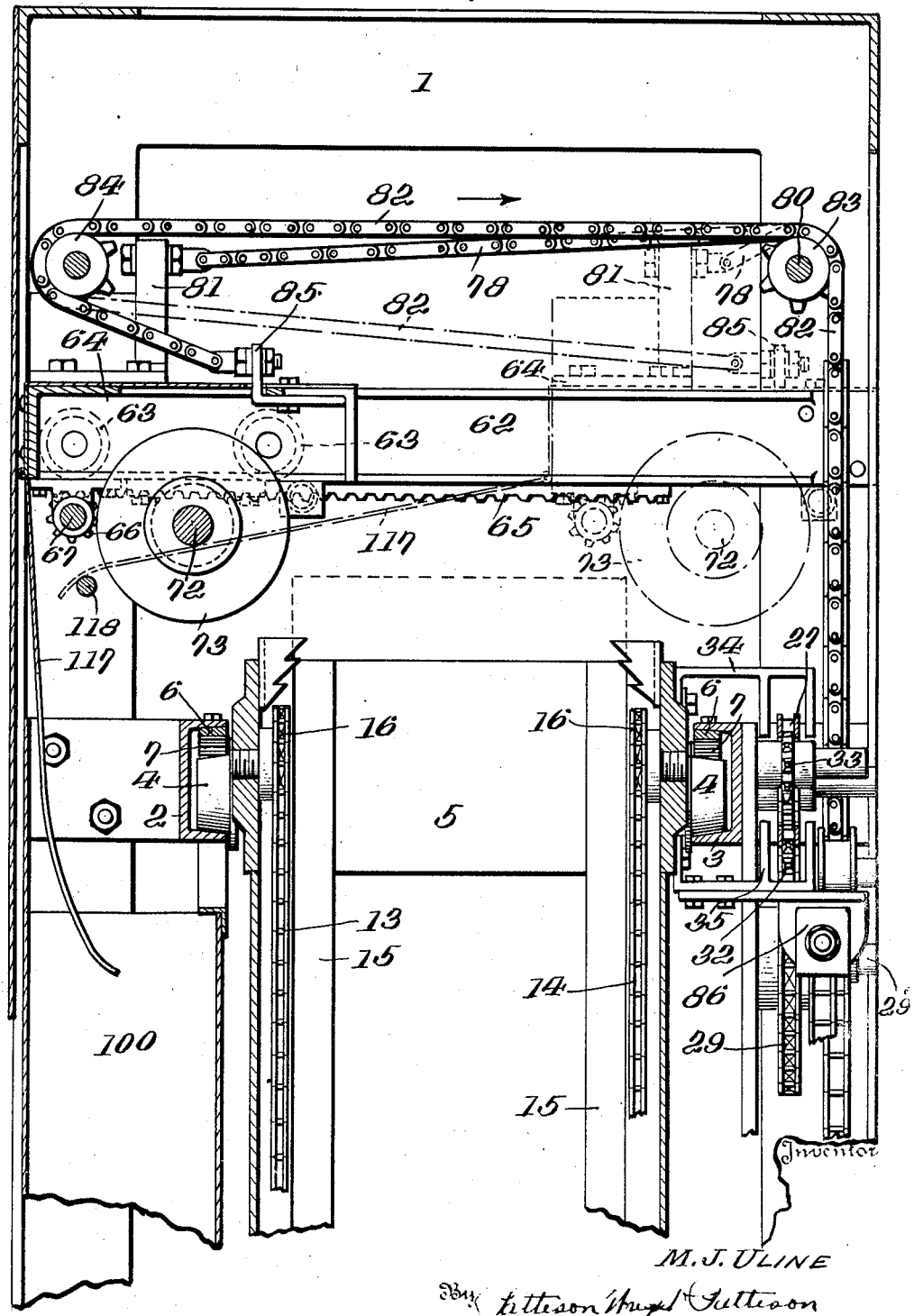

Oct. 24, 1939.　　　　　M. J. ULINE　　　　　2,177,445
MACHINE FOR CUTTING BLOCKS OF ICE INTO SMALL CUBES
Filed May 11, 1937　　　7 Sheets-Sheet 5

FIG. 4.

Inventor
M. J. ULINE
Pattison, Wright & Pattison
Attorneys

Oct. 24, 1939. M. J. ULINE 2,177,445
MACHINE FOR CUTTING BLOCKS OF ICE INTO SMALL CUBES
Filed May 11, 1937 7 Sheets-Sheet 6
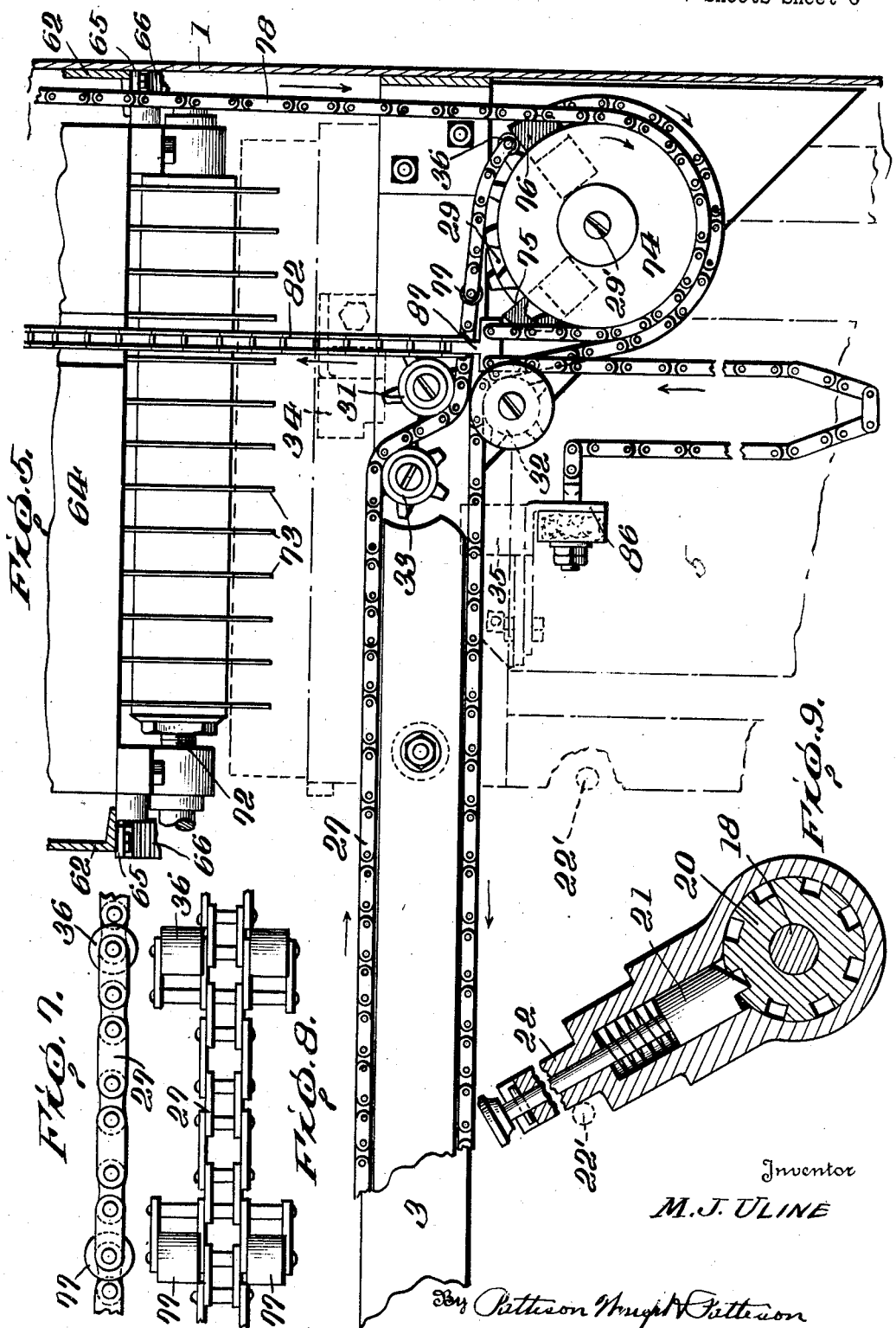
Inventor
M. J. ULINE
By Patterson Wright & Patterson
Attorneys

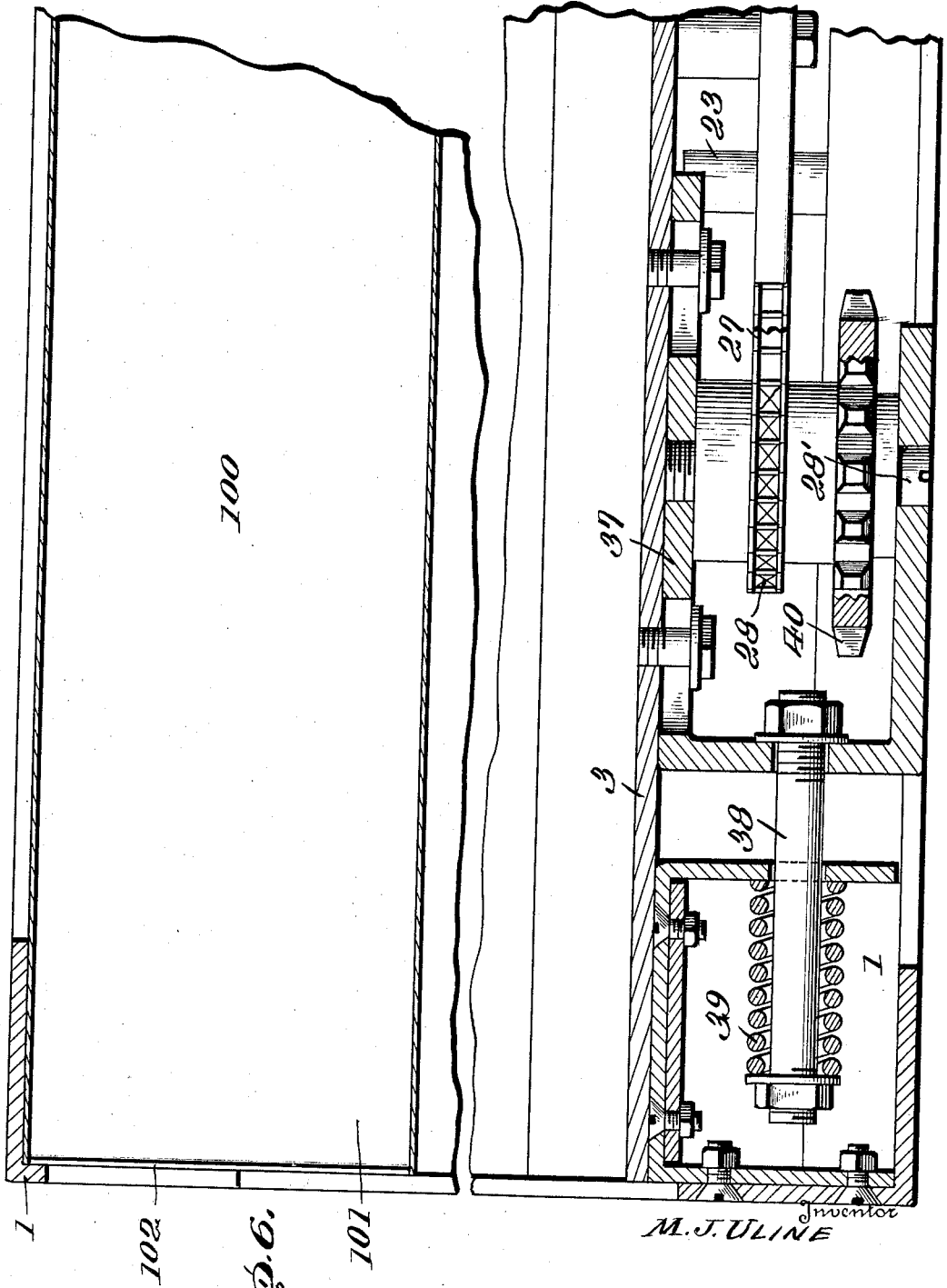

Patented Oct. 24, 1939

2,177,445

UNITED STATES PATENT OFFICE 2,177,445

MACHINE FOR CUTTING BLOCKS OF ICE INTO SMALL CUBES

Migiel J. Uline, Washington, D. C.

Application May 11, 1937, Serial No. 142,039

6 Claims. (Cl. 143—38)

This invention relates to certain new and useful improvements in machines for cutting blocks of ice into small cubes, the object being to provide a machine which is composed of a very few parts so arranged and cooperating with one another that a very strong and durable machine is provided of such a size that it will pass through an ordinary doorway.

Another object of the invention is to provide positive means for intermittently moving the saw carriage at a predetermined speed of travel whereby the ice carriage and saw carriage will be positively driven in timed relation with one another.

Another object of the invention is to provide novel means for catching the "saw dust" and snow and discharging the same into a receptacle to prevent the same from collecting on the movable members of the machine and retarding the operation thereof.

A still further object of the invention is to provide the saw carriage with a snow deflector and catcher in the form of a resilient plate in order to allow the same to flex in its travel over a stationary scraper bar arranged above a snow box so that the snow adhering thereto will be removed therefrom by the movement of the saw carriage.

A still further object of the invention is to provide means for independently driving the saws through the medium of independent electric motors whereby the disadvantages of transmission means is prevented and the speed of the machine can be increased.

Another object of the invention is to provide cables in the form of chains for driving the saw carriage in opposite directions, one of said cables being driven by the driving means for the ice carriage and the other cable being operated by the momentum of the ice carriage.

Other and further objects and advantages of the invention will be hereinafter set forth and the novel features thereof defined by the appended claims.

In the drawings, Figure 1 is a side elevation of my improved construction of machine with the casing removed;

Figure 2 is an enlarged top plan view of the feed end of the machine;

Figure 2a is an enlarged plan view of the other end of the machine;

Figure 3 is a section taken on line 3—3 of Figure 1;

Figure 4 is a section taken on line 4—4 of Figure 2a;

Figure 1:
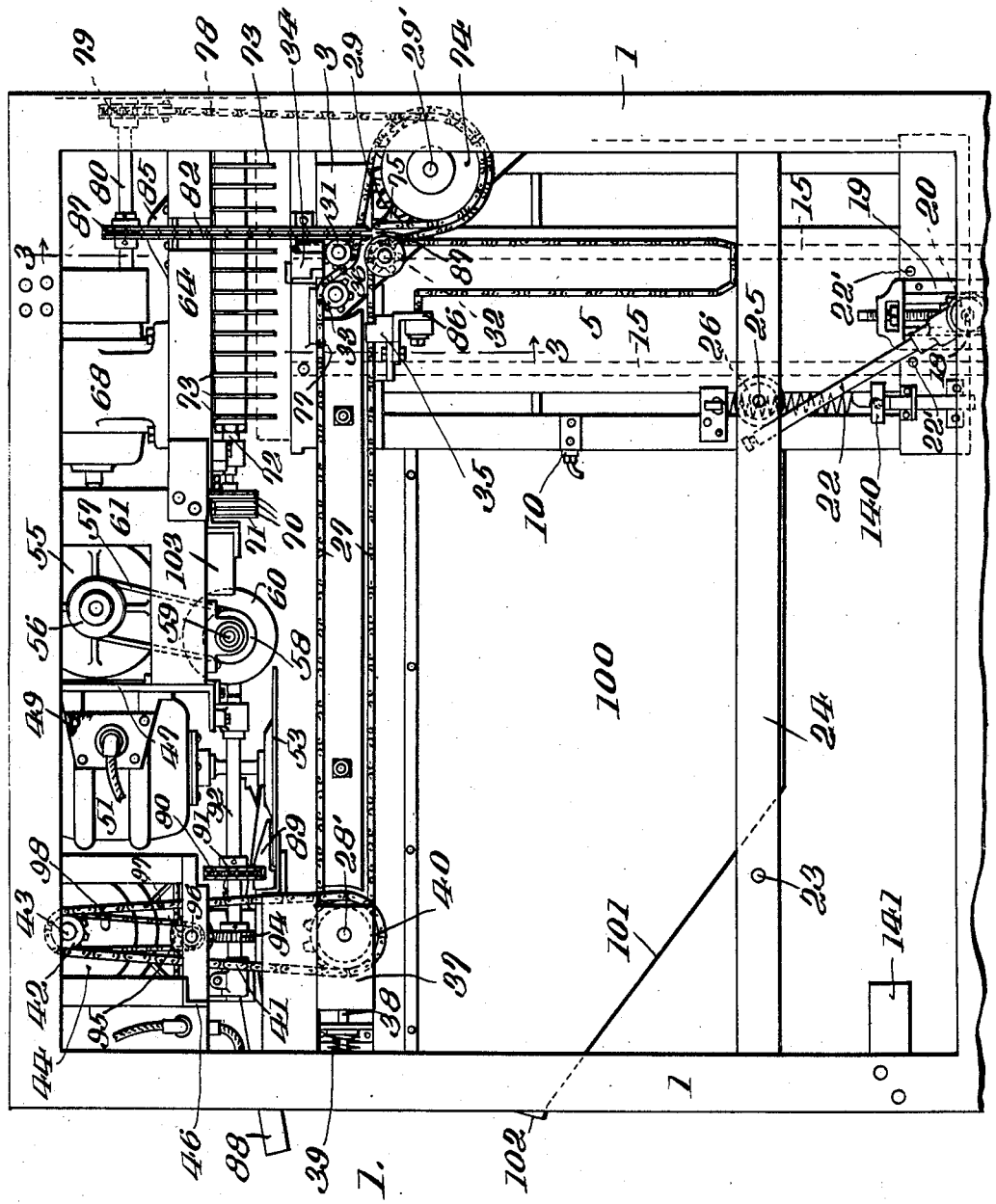

Figure 5 is an enlarged view showing the driving mechanism for the ice carriage and saw carriage partly in section;

Figure 6 is an enlarged horizontal broken section showing the means for maintaining the endless chain for driving the ice carriage taut;

Figure 7 is a detail side elevation of the drive chain showing the drive lugs;

Figure 8 is a detail top plan view of the drive chain; and

Figure 9 is a section through the pawl and ratchet mechanism.

In carrying out my invention I employ an oblong frame 1 enclosed in a casing and having disposed longitudinally therein a pair of spaced channel rails 2 and 3, the lower flanges of which have inclined inner faces on which are mounted conical rollers 4 carried by the upper end of an ice carriage 5 in the form of a box for suspending the carriage between the rails so that it can reciprocate. The upper flanges of the rails 2 and 3 carry racks 6 over which travel pinions 7 carried by shaft 8 mounted in suitable bearings 9 secured to the outer wall of the ice carriage in order to maintain the carriage in its proper alignment as it is reciprocated back and forth.

The ice carriage is provided with an open side to allow the insertion of a block of ice and is provided with a pivoted gate bar 10 for holding the ice therein. The ice is supported within the ice carriage by a movably mounted bottom or platform 11 supported therein by a transversely disposed rod 12 carried by endless chains 13 and 14 disposed between spaced vertically disposed flanges 15 on the opposite inner walls of the ice carriage as clearly shown in Figure 4, the platform 11 being provided with members 11' cooperating with the flanges 15 in order to maintain the platform in a horizontal position as it is moved up and down.

The endless sprocket chains 13 and 14 travel over sprocket wheels 16 disposed in the upper end of the ice carriage and over sprocket wheels 17 disposed in the lower end of the carriage, said sprocket wheels 17 being carried by a shaft 18 mounted in adjustable bearings 19 whereby the endless sprocket chains can be maintained taut at all times.

Mounted on the shaft 18 is a ratchet wheel 20 engaged by a pawl 21 carried by pivoted lever 22 which is adapted to cooperate with a pin 23 carried by a side bar 24 of the frame in order to swing the lever in one direction. The bar 24 carries a pin 25 carrying a roller 26 which cooperates with the lever 22 to swing the lever in an opposite direction as the ice carriage is moved to engagement therewith. The movement of the lever 22 is limited by stops 22'.

It will be seen that by this construction the lever is operated as the carriage is reciprocated in order to rotate the shaft 18 which in turn will drive the endless sprocket chains and raise the platform intermittently as the carriage is reciprocated intermittently in order to bring the upper end of the block of ice disposed therein in the path of the saws as will be hereinafter fully described.

In order to provide means for intermittently reciprocating the ice carriage, I provide an endless chain 27 which travels over the rail 3 and is mounted on a sprocket wheel 28 at one end and on a sprocket wheel 29 at its other end, idle sprocket wheels 31, 32 and 33 being disposed in the path of travel to cause the chains to travel downwardly from the point of the sprocket 33 downwardly around the sprocket wheel 29.

The ice carriage is provided with bifurcated projections 34 and 35 which are adapted to be engaged by driving lugs 36 in the form of rollers arranged on each side of the endless drive chain 27 so that as the chain moves in the direction as shown by the arrow it will move the ice carriage into the position shown in Figure 5 which is at one end of the travel of the ice carriage and is in position to have the saw carriage moved transversely thereover as will be later described.

As the drive lug 36 comes in contact with the bifurcated projection 35, the carriage is moved in the opposite direction or into its initial starting position so that kerfs will first be cut at right angles to the previously formed kerfs and the previously formed cubes will be severed therefrom by the horizontally disposed saws which will be later described.

After the carriage is returned to its original position, the drive lugs 36 engage the drive lugs 34 and move it to the opposite end of the machine and as it moves, the platform is elevated by the pawl and ratchet mechanism so as to position the cake of ice within the ice carriage into such a position that transverse kerfs can be cut in the top thereof.

The sprocket wheel 28 carrying the drive chain 27 is mounted in a movable housing 37 having connected thereto a bolt 38 surrounded by a coil spring 39 in order to hold the drive chain under tension and maintain it taut at all times so as to insure a positive drive for the ice carriage.

The sprocket wheel 28 is carried by shaft 28' and fixed to said sprocket is a sprocket wheel 40 over which passes an endless sprocket chain 41 carried by sprocket 42 of a driven shaft 43 extending outwardly from a gear reduction box 44 into which extends a shaft of an electric motor 45 so that the speed of travel of the motor shaft will be reduced in order to reduce the speed of travel of the chain 27 for driving the ice carriage.

The motor 45 and the gear reduction box are supported by transverse bars 46 as shown in Figure 2. Disposed in advance of the cross bars 46 of the frame 1 is a cross bar 47 which carries brackets 48 and 49 for supporting electric motors 50 and 51 to the lower end of the drive shafts of which are connected horizontally disposed saws 52 and 53 for cutting off the previously formed cubes of ice.

Secured to the opposite side of the cross bar 47 of the frame is a motor supporting bracket 54 in which is arranged an electric motor 55, the drive shaft of which carries grooved pulleys 56 over which pass belts 57 which extend around grooved pulleys 58 mounted on the shaft 59 which is provided with a plurality of saws 60 forming a gang saw, said shaft being mounted in a suitable bearing carried by a frame 61 supported in the main frame whereby the gang saw will be driven through the medium of the belt to form yieldable driving means to prevent the same from being injured.

Disposed transversely in the end of the frame are a pair of channel rails 62, the lower flanges of which are inclined and over which travel conical rollers 63 carried by a saw carriage 64. Racks 65 are secured to the lower faces of the flanges of the rails 62 on which travel pinions 66 carried by shaft 67.

The saw carriage carries an electric motor 68, the drive shaft of which is provided with grooved pulleys 69 over which travel belts 70 which travel over pulleys 71 carried by a shaft 72 provided with a plurality of saws 73 forming a gang saw for forming transversely disposed kerfs in the block of ice when disposed within the ice carriage.

From the foregoing description it will be seen that I have described an ice carriage for supporting a block of ice with means for intermittently reciprocating the same and for intermittently elevating a block of ice therein so that the saws 73 as the carriage is moved will cut transversely disposed kerfs in the top of the ice and the saws 58 will cut kerfs at right angles to the previously formed kerfs and the saws 52 and 53 will cut off the previously formed cubes.

In order to drive the saw carriage in timed relation with the ice carriage so that when the ice carriage reaches its limit of travel and is stationary the reciprocating saw carriage will be moved in order to cut transverse kerfs in the block of ice, I provide the shaft 29' on which the sprocket wheel 29 is loosely mounted with a sprocket wheel 74 provided with spaced projections 75 and 76, the projection 76 being adapted to be engaged by the driving lugs 36 so as to rotate the sprocket wheel in the direction of travel of the chain and the projection 75 being adapted to be engaged by driving lugs 77 carried by the chain 27 and constructed in substantially the same manner as the driving lugs 36 which prevents the sprocket wheel from rotating ahead of the driving lugs 36 for the purpose of preventing the saw carriage from moving beyond a predetermined speed as will be hereinafter fully described.

The saw carriage 64 is reciprocated in one direction by a chain 78 which passes over a sprocket wheel 79 carried by shaft 80 and has its end connected to a bracket 81 and is reciprocated in the opposite direction by sprocket chain 82 which passes over sprocket wheels 83 and 84 and has its free end connected to a bracket 85 carried by the saw carriage. The opposite end of the chain 82 is connected to a bracket 86 carried by the ice carriage 5 as clearly shown in Figures 1 and 5, the free end of the chain 78 being connected to the chain 82 as shown at 87.

As the driving chain 27 for the ice carriage moves in the direction to move the carriage into position to have transversely formed kerfs formed in the block of ice, the drive lugs 36 rotate the sprocket wheel 74 so as to pull the carriage in the direction as shown by the arrow in Figure 3 in order to form transversely disposed kerfs in the top of the cake of ice and as the ice carriage 5 returns to its normal position, the slack in the chain 82 is taken up and by the momentum of the ice carriage through the medium of the chain 82, the saw carriage is returned to the position shown in Figure 3 whereby the saw carriage and ice carriage are intermittently reciprocated in timed relation with one another so that transverse kerfs can be formed in the block of ice when the block is stationary.

It will be noted that when the drive lug 36 is in engagement with the projection 76 and the carriage is moving in the direction of the arrow as shown in Figure 3, the tendency of the rotating saws is to cause the carriage to move beyond the predetermined speed and as the sprocket 74 is rotated, the lug 77 engages the projection 75 and prevents the sprocket wheel 74 from being drawn by the rotation of the saw ahead of the drive lug 36 whereby I am able to positively drive the saw carriage in the cutting action of the saw at a predetermined speed.

As the two chains 78 and 82 have portions which are vertically disposed there is a certain drag on the saw carriage in its movement in both directions so as to retard the movement of the carriage in its reciprocation back and forth in order to maintain the carriage in its proper position during the cutting action and previous to its cutting action so that the saws will be out of the path of travel of the block of ice before the saw carriage moves to cut the transverse kerfs and out of the path of travel after the transverse kerfs have been made.

This provides a novel construction of driving means for the saw carriage whereby it is intermittently reciprocated at a predetermined speed and held at the end of its movement by the weight of the chains counterbalancing one another.

The machine is provided with a cube delivering chute 88 which extends downwardly over the horizontally disposed saws 52 and 53 so that as the previously formed cubes are severed from the block of ice, they will be discharged from the chute 88 into any suitable receptacle to collect the same.

In order to remove the snow from the horizontally disposed saws, I provide scrapers 89 carried by an endless sprocket chain 90 passing over sprocket wheels 91 carried by shafts 92 and 93, the shaft 92 carrying a worm wheel 94 which is engaged by worm 95 carried by shaft 96 which is provided with a sprocket 97 over which pass a chain 98 which pass over a sprocket wheel 99 fixed on the driven shaft 43 so as to rotate the shaft 92 in order to cause the scrapers to work transversely over the horizontally disposed saws and to scrape the snow therefrom and carry the same transversely of the machine and deposit the same into a snow box 100 disposed within the frame along one side thereof as shown in Figures 1 and 6, said snow box having an inclined bottom portion 101 terminating in an outlet 102 through which the snow can be removed.

In order to catch and convey the snow from the saws 60 I provide a housing 103 which is provided with a tray portion 104 over which travels scrapers 105 carried by an endless chain 106 which is mounted on sprockets 107 and 108 carried respectively by shaft 109 and shaft 110, the shaft 110 being driven by a sprocket chain 111 passing over sprockets 112 and 113 secured respectively to the shaft 110 and the shaft 93.

The tray portion 104 terminates over the snow box 100 so that the snow carried thereon is conveyed transversely of the machine and deposited in the snow box. The housing 103 is carried by a bracket as shown in Figure 4 which has casing 114 carried thereby in which are pivoted a plurality of weighted fingers 115 disposed between the saws 60 to catch and hold the cubes in the cutting of the ice and the downward movement of these fingers is limited by stops 116 formed on the ends thereof as clearly shown.

In order to catch and convey the snow from the gang saw 73 of the reciprocating carriage, I pivotally connect to the carriage a resilient plate 117 as clearly shown in Figure 3 which travels over a rod 118 disposed in the frame and engages the casing enclosing the machine so as to assume the position as shown in full lines in Figure 3 when the carriage is at one end of the rails and the position is shown in dotted lines when the carriage is at the other end of the rails and as the saws 73 pass through the upper end of the cake of ice, the snow or "sawdust" is collected on the resilient plate 117 and as the carriage moves back, the rod scrapes it off and deposits it in the snow box as clearly shown in Figure 3.

This provides a very simple construction of catching and discharging the snow from the saws of the reciprocating carriage causing the same to be either deflected or carried into the snow box by the movement of the carriage.

The ice carriage is preferably provided with a member 140 which is connected to the platform so as to be moved into position to operate a switch 141 to stop the machine automatically when the platform has been returned to the lowermost position.

In the operation of the machine as herein shown and described, assuming that the ice carriage is at the open end of the frame and that the gate bar has been swung open, a block of ice is inserted in the ice carriage and the electric motors are started, the same being controlled by a conventional form of switch. Through the reduction gear box the endless drive chain for the ice carriage is driven and the lugs carry the carriage to the opposite end of the machine and as the drive lugs pass over the sprocket 33 they move out of engagement with the bifurcated projection 34 so that the carriage remains stationary until the drive lugs 36 engage the bifurcated projection 35 to return the same to its initial position. When the carriage has reached its limit of movement in passing away from the feed end it remains stationary between the disengagement of the lugs 36 with the bifurcated projection 34 and the engagement of the lugs 36 with the bifurcated projections 35. As the driving chain 27 is moving continuously, the lugs are brought into engagement with the projection 76 which rotates the sprocket wheel over which the chain 78 passes and draws the carriage transversely over the block of ice so that the gang saw carried by the saw carriage cuts transversely disposed grooves in the block of ice.

As the tendency of the saw carriage is to travel ahead of its driving means after the saw has become embedded within the ice, the lugs 77 come in contact with the projections 75 so that the sprocket wheel can only travel as fast as the drive chain 27 whereby the predetermined speed of travel is maintained during the cutting action of the saws of the saw carriage.

As the lugs 36 come in contact with the projections 35 the carriage is returned to its original position and as the chain 82 is connected thereto the momentum of the carriage draws the chain in order to return the saw carriage in position to make another cut and this is repeated as long as the electrical energy is supplied to the motor for driving the chain.

As the carriage moves back and forth the lever 22 carrying the dog operates on the ratchet so as to intermittently elevate the platform in order to position the cake of ice. When the carriage is returned to its original position, the block of ice is drawn through the rotary gang saw 60 to cut kerfs at right angles to the previously formed kerfs and these cubes thus formed by the transversely and longitudinally disposed kerfs are severed by the horizontally disposed saws and as the driving mechanism for the snow scrapers is connected to the drive for the chain 27, these chains are operating continuously so as to remove the snow from the saws 60 and the horizontally disposed saw. As the saw carriage is moving back and forth, the snow from the gang saw is caught by the resilient plate and deposited in the snow box so that all of the "sawdust" created by the cutting of the cubes is discharged into the snow box.

As the platform of the ice carriage is intermittently elevated, the ice is advanced in position to be cut and as the supports for the platform travel over the sprocket wheels at the upper end of the carriage, the platform returns automatically to its original position as the pawl and ratchet mechanism allows the platform to drop by its own weight.

The fingers 115 which are arranged between the saws not only prevent the cubes from working backwardly but help to remove the snow and by this construction when the machine is in operation, as the cubes are cut they are forced by the movement of the saws outwardly to deliver in front of the machine.

What I claim is:

1. In a machine for cutting blocks of ice into small cubes, the combination with an intermittently reciprocating ice carriage for supporting and intermittently elevating a block of ice into position to be cut, of a saw carriage having a gang saw adapted to move transversely across said block of ice when said carriage is stationary, a fixed gang saw arranged in the path of travel of said block of ice in said ice carriage for cutting kerfs at right angles to the previously formed kerfs when said carriage is moving in one direction, a horizontally disposed saw arranged in the path of travel of said block of ice for cutting off the previously formed cubes from said block of ice, means for reciprocating said ice carriage, a pair of cables connected to said saw carriage, an intermittently rotating member for driving one of said cables for moving said saw carriage in one direction and a connection between the other cable and said ice carriage for driving said saw carriage in the opposite direction by the momentum of said ice carriage.

2. In a machine for cutting blocks of ice into small cubes, the combination with an intermittently reciprocating ice carriage for supporting and intermittently elevating a block of ice into position to be cut, of a saw carriage having a gang saw adapted to move transversely across said block of ice when said carriage is stationary, a fixed gang saw arranged in the path of travel of said block of ice in said ice carriage for cutting kerfs at right angles to the previously formed kerfs when said carriage is moving in one direction, a horizontally disposed saw arranged in the path of travel of said block of ice for cutting off the previously formed cubes from said block of ice, an endless chain provided with driving lugs for intermittently reciprocating said ice carriage, a loosely mounted wheel carrying a projection adapted to be engaged by said driving lugs, a cable passing over said wheel having a connection with said saw carriage for moving said saw carriage in one direction, a cable having a connection with said saw carriage for moving said saw carriage in the opposite direction and a connection between the last mentioned cable and said ice carriage for operating said cable by the momentum of said ice carriage.

3. In a machine for cutting blocks of ice into small cubes, the combination with an intermittently reciprocating ice carriage for supporting and intermittently elevating a block of ice into position to be cut, of a saw carriage having a gang saw adapted to move transversely across said block of ice when said carriage is stationary, a fixed gang saw arranged in the path of travel of said block of ice in said ice carriage for cutting kerfs at right angles to the previously formed kerfs when said carriage is moving in one direction, a horizontally disposed saw arranged in the path of travel of said block of ice for cutting off the previously formed cubes from said block of ice, an endless chain for intermittently reciprocating said ice carriage, a pair of chains connected to said saw carriage for intermittently reciprocating the same, a sprocket wheel for operating one of said chains provided with a projection, a driving lug carried by the endless chain for driving the ice carriage engaging said projection for rotating said sprocket wheel to move said saw carriage in one direction and means for connecting the other chain to said ice carriage for moving said saw carriage in a reverse direction.

4. In a machine for cutting blocks of ice into small cubes, the combination with an intermittently reciprocating ice carriage for supporting and intermittently elevating a block of ice into position to be cut, of a saw carriage having a gang saw adapted to move transversely across said block of ice when said carriage is stationary, a fixed gang saw arranged in the path of travel of said block of ice in said ice carriage for cutting kerfs at right angles to the previously formed kerfs when said carriage is moving in one direction, a horizontally disposed saw arranged in the path of travel of said block of ice for cutting off the previously formed cubes from said block of ice, means for intermittently reciprocating the ice carriage, a pair of cables connected to said saw carriage, a rotary member for driving one of said cables, a pair of projections carried by said rotary member, a continuously moving member provided with spaced driving lugs cooperating with said projections for rotating said rotary member and means for connecting the other cable to said ice carriage for reciprocating said saw carriage in one direction by the momentum of said ice carriage.

5. In a machine for cutting blocks of ice into small cubes, the combination with an intermittently reciprocating ice carriage for supporting and intermittently elevating a block of ice into position to be cut, of a saw carriage having a gang saw adapted to move transversely across said block of ice when said carriage is stationary, a fixed gang saw arranged in the path of travel of said block of ice in said ice carriage for cutting kerfs at right angles to the previously formed kerfs when said carriage is moving in one direction, a horizontally disposed saw arranged in the path of travel of said block of ice for cutting off the previously formed cubes from said block of ice, an endless chain provided with driving lugs for reciprocating said ice carriage, a rotary sprocket wheel provided with a pair of projections cooperating with the driving lugs of said endless chain, a chain passing over said sprocket wheel connected to said saw carriage and another chain connected to said ice carriage having its end connected to said saw carriage.

6. In a machine for cutting blocks of ice into cubes, the combination with an intermittently reciprocating ice carriage for supporting and intermittently elevating a block of ice, of a reciprocating saw carriage having a gang saw adapted to move transversely across said block of ice when said ice is stationary, a fixed gang saw arranged in the path of travel of said block of ice in said ice carriage cutting kerfs at right angles to the previously formed kerfs when said block is moving in said ice carriage, a horizontally disposed saw arranged in the path of travel of said block of ice for cutting off the previously formed cubes from said block, means for moving said saw carriage in one direction and means operated by the momentum of said ice carriage for operating said saw carriage in an opposite direction.

MIGIEL J. ULINE.